(12) United States Patent
Licht et al.

(10) Patent No.: US 8,225,046 B2
(45) Date of Patent: Jul. 17, 2012

(54) METHOD AND APPARATUS FOR SAVING POWER BY EFFICIENTLY DISABLING WAYS FOR A SET-ASSOCIATIVE CACHE

(75) Inventors: Martin Licht, Round Rock, TX (US); Jonathan Combs, Austin, TX (US); Andrew Huang, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 378 days.

(21) Appl. No.: 11/541,174

(22) Filed: Sep. 29, 2006

(65) Prior Publication Data

US 2008/0082753 A1 Apr. 3, 2008

(51) Int. Cl.
*G06F 12/00* (2006.01)
*G06F 13/00* (2006.01)
*G06F 13/28* (2006.01)
*G06F 1/26* (2006.01)
*G06F 1/32* (2006.01)
(52) U.S. Cl. ........................ 711/128; 713/320
(58) Field of Classification Search .................. 711/128; 713/320
See application file for complete search history.

(56) References Cited

U.S. PATENT DOCUMENTS

| 5,625,826 | A | 4/1997 | Atkinson |
| 5,761,715 | A * | 6/1998 | Takahashi ..................... 711/128 |
| 2004/0039886 | A1 | 2/2004 | Christofferson et al. |
| 2005/0080994 | A1 | 4/2005 | Cohen et al. |
| 2005/0246499 | A1* | 11/2005 | Saida et al. ................... 711/128 |
| 2007/0113013 | A1* | 5/2007 | Knoth ........................... 711/128 |

* cited by examiner

*Primary Examiner* — Jared Rutz
*Assistant Examiner* — Ryan Bertram
(74) *Attorney, Agent, or Firm* — Mnemoglyphics, LLC; Lawrence M. Mennemeier (57) ABSTRACT

A method and apparatus for disabling ways of a cache memory in response to history based usage patterns is herein described. Way predicting logic is to track consecutive misses to ways of a cache, i.e. hits/reads to other ways of cache. Based on the usage of ways and the non-usage of other ways, the way predicting logic determines if a way is to be powered down. In response to determining a way is to be powered down, the way predicting logic generates a power signal to power down an associated. Furthermore, upon a subsequent hit to a powered down way, the way predicting logic toggles the power signal to power up the associated way to ensure performance.

28 Claims, 7 Drawing Sheets

METHOD AND APPARATUS FOR SAVING POWER BY EFFICIENTLY DISABLING WAYS FOR A SET-ASSOCIATIVE CACHE

FIELD

This invention relates to the field of memory and, in particular, to power savings for cache memories.

BACKGROUND

Providing design flexibility in a cache by allowing a variety of size and associativity choices, while maintaining the speed of the cache in locating/storing a requested element, may be highly advantageous for architectures that utilize a cache. Traditionally, there have been three types of cache organizations that have been used: the fully associative, the k-way set associative; and the direct mapped cache organizations.

In a fully associative cache organization, each item of information from a main system memory is stored as a unique cache entry. There is usually no relationship between the location of the information in the cache and its original location in main system memory.

Typically, a set associative cache divides the cache memory into k banks of memory, which is also known as k ways. Usually, a set associative cache logically views memory as broken up into pages. Every location within a page of memory is capable of being stored in one location of each of the k ways, which forms a set of locations capable of storing multiple memory locations. When a memory request is made, the set associative cache will typically compare the memory request with a cache location in a number of the ways.

However, as power savings, and heat dissipation due to power consumption, become more prevalent concerns, power consumption of individual parts of processors, such as caches, becomes an ever pressing concern. In fact, current caches make up a good percentage of active power dissipated. This level of power consumption is usually due to speculatively reading multiple ways of a given set to avoid the performance loss associated with waiting for a tag array to denote a single way to be accessed. Therefore, as caches grow both in size and the number of ways, more power is consumed reading multiple locations to provide in response to determining a way to be loaded from.

DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific types of cache, logic, counters, state machines, circuits, etc. in order to provide a thorough understanding of the present invention. It will be apparent, however, to one skilled in the art that these specific details need not be employed to practice the present invention. In other instances, well known components or methods, such as specific multi-core and multi-threaded processor architectures, cache organizations/implementations, cache indexing, replacement algorithms, hit/miss logic, and other specific operational details of microprocessors, have not been described in detail in order to avoid unnecessarily obscuring the present invention.

The method and apparatus described herein are for disabling cache ways in response to history based usage patterns. Numerous embodiments discussed below reference the use of an instruction cache in a microprocessor to illustrate the operation of disabling cache ways. However, the methods and apparatus for disabling cache ways in response to history based usage patterns are not so limited, as they may be implemented on or in association with any integrated circuit device or system, such as cell phones, personal digital assistants, embedded controllers, mobile platforms, desktop platforms, and server platforms, as well as in conjunction with any type of memory or cache memory, such as low-level data caches, low-level instruction caches, higher-level caches, system memory, or other memory.

Figure 1:
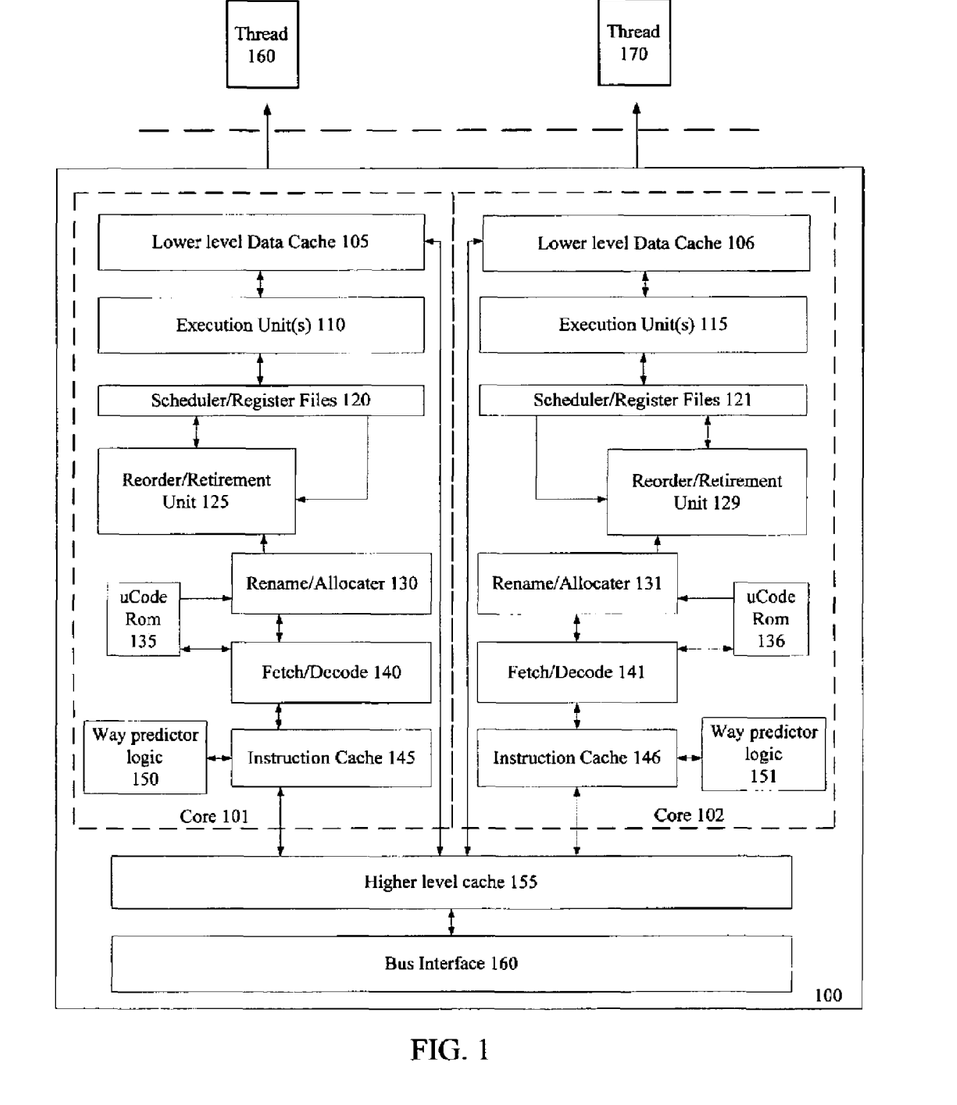
FIG. 1 illustrates an embodiment of a multi-core processor capable of disabling specific ways of a cache in response to cache usage patterns.

Referring to FIG. 1, an embodiment of a processor capable of disabling ways of a cache in response to history based usage patterns is illustrated. In the embodiment illustrated, processor 100 includes two cores, cores 101 and 102; although, any number of cores may be present. A core often refers to any logic located on an integrated circuit capable of maintaining an independent architectural state, wherein each independently maintained architectural state is associated with at least some dedicated execution resources. For example, in FIG. 1, core 101 includes execution unit(s) 110, while core 102 includes execution unit(s) 115. Even though execution units 110 and 115 are depicted as logically separate, they may physically be arranged as part of the same unit or in close proximity. However, as an example, scheduler 120 is not able to schedule execution for core 101 on execution unit 115.

In contrast to cores, a hardware thread typically refers to any logic located on an integrated circuit capable of maintaining an independent architectural state, wherein the independently maintained architectural states share access to execution resources. Often, a core and a hardware thread are viewed by an operating system as individual logical processors, with each logical processor capable of executing at least one software thread. Therefore, a processor, such as processor 100, is capable of concurrently executing multiple threads, such as threads 160 and 170. Although each core, such as core 101, is illustrated as capable of executing a single thread, a core is potentially also capable of concurrently executing multiple software threads.

In one embodiment, core 101 and 102 may be asymmetric cores with different components and configurations. Alternatively, processor 100 includes symmetric cores 101 and 102 with similar components, architecture, and organization. Therefore, the functional blocks in core 101 will be discussed, to avoid duplicate discussion in regards to core 102. Note that the functional blocks illustrated are logical functional blocks, which may include logic that is shared between, or overlap boundaries of, other functional blocks. In addition, each of the functional blocks are not required and are potentially interconnected in different configurations. For example, instruction cache 145, which is discussed in more detail below, may be coupled before fetch and decode unit 140, as shown, between fetch and decode units, or after fetch and decode units.

In one embodiment, processor 100 includes a bus interface unit 160 for communicating with external devices and a higher level cache 155, such as a second-level cache, that is shared between core 101 and 102. In an alternative embodiment, core 101 and 102 each include separate second-level caches.

Instruction cache 145, in the illustrated embodiment, is coupled between fetch/decode logic 140 and second-level cache 155. As an example, instruction cache 145 is to cache recently fetched instructions. Depending on where the instruction cache is located in a pipeline of processor 100, instruction cache 145 may store raw fetched instructions, decoded instructions, or other forms of instructions. In this example, cache 145 is a set associative cache. In a set associative cache, a data array of the cache to store elements is broken up into K banks or K ways, which are often the same size of pages of a system memory, as logically viewed by the system. As system memory is often much larger than caches, more pages than the K ways of cache are mapped to the K ways. As a result, the same location in each of the K ways forms a set. Locations with the same offset in each of the pages of memory are often mapped to a "set" of entries within the K ways. Consequently, any single location in system memory may be potentially stored in any of the locations within a set that the location is mapped to.

For example, an instruction held in system memory, when fetched, is stored in an entry in cache 145, which resides in one way of K ways of cache 145. When the entry holding the instruction is requested or retrieved in response to a request from cache 145, it is referred to as a cache hit. Often, a tag value is determined from an issued address and compared to tag values in a tag array within cache 145. In this case, a hit also often refers to the tag match indicating the sought after element/location is stored in an entry within a particular way of cache 145, i.e. "a hit to the particular way of cache 145." In contrast, a miss to cache 145 typically refers to not finding an element or matching a tag. Here, the element is fetched from a higher-level memory. Other cache organizations utilizing ways or banks may also be used. As an example of another cache organization, co-pending application entitled, "K-Way Direct Mapped Cache," with Ser. No. 10/831,488 discloses a K-way direct mapped cache organization.

In one embodiment, instruction cache 145 is capable of having ways disabled based on usage patterns of instruction cache 145. Here, way predictor logic 150 is coupled to instruction cache 145. As stated above in reference to overlapping of functional blocks, although way predictor logic 150 is illustrated as separate from instruction cache 145, way predictor logic potentially overlaps or is included within instruction cache 145. As an example, parts of way predictor logic 150 are included in instruction cache 145's control logic.

Way predictor logic 150 is to generate a power signal associated with a way of instruction cache 145. As an example, way predictor logic tracks accesses to instruction cache 145. An access includes any access to a cache, such as an eviction, a hit, a miss, or any other known memory access. Based on the accesses, such as a number of consecutive misses to a way, tracked by way predictor logic 150, the way in instruction cache 145 is potentially determined to be powered down.

As a specific illustrative example, each way is associated with logic to track hits, reads, and/or consecutive misses to cache 145. In one embodiment, the logic associated with each way tracks hits to a particular way the logic is associated with, as well as hits to other ways of cache 145. In other words, the logic associated with each way tracks a number of misses to its associated way. Consequently, way predictor logic 150 determines based on the number of hits to the particular way as compared to hits to the other ways of cache 145, if the particular way of cache 145 is to be disabled. Essentially, if the particular way is not as active as compared to the other ways of a cache, it is potentially disabled to save power. Here, a predetermined amount of inactivity or consecutive misses, which is variable by design, may designate when a way of cache 145 is to be disabled. This variability allows for a design to balance between power savings and performance. Consequently, reasonably inactive ways of a cache, such as instruction cache 145, are disabled, when they are not often utilized as predicted by actual historical usage, and enabled, when active, to ensure optimum performance.

Although the specific example regarding tracking of hits to particular ways compared to other ways of a cache is discussed above, any number methods for tracking accesses, determining usage of ways, and determining ways to be disabled based on that usage may be used. For example, accesses to a way are tracked over a specified amount of time. If the number of accesses within the specified amount of time do not reach a predetermined threshold number of accesses, the cache way is determined to be powered down. In another example, consecutive misses to a way are tracked, and if a predetermined number of consecutive misses is tracked for a given way, then the given way is determined to be powered down.

As stated above, way predictor logic 150 is to provide a power signal. In one embodiment, the power signal is a logical signal generated to represent and enable/disable signal to a way of cache. Here, when the power signal represents a first logical state, such as a logical high value or a logical one, an associated way of cache 145 is enabled, i.e. powered up or power is supplied to the way. In contrast, when the power signal represents a second logical state, such as a low logical value or a logical zero, the associated way of cache 145 is to be disabled, i.e. powered down, power removed, and/or power gated. In one embodiment, the power signal is based on a saturation signal from a saturation counter used to track hits to other ways of the cache, i.e. consecutive misses to an associated way. Use of counters is discussed in more detail below. However, a power signal is not limited to a enable/disable type of signal. As another example, a power signal is potentially an interrupt like signal, that when generated, is handled by a user-level handler to toggle the power to an associated way of cache. In fact, in one embodiment, a power signal is any signal generated, which results in toggling a way of cache from a powered state to a low/non-powered state, or inversely a low/non-powered state to a powered state. Examples of removing power to a way include gating, reducing, or sleeping a way of cache.

Next, fetch, decode, and branch prediction unit 140 is coupled to instruction cache 145. In one example, core 101 includes a fetch unit to fetch instructions and a decode unit to decode the fetched instructions. In another embodiment, fetch and decode block 140 includes a pre-fetcher having a branch predictor and/or a branch target buffer. In addition, a read only memory, such as microcode ROM 135, is potentially used to store longer or more complex decoded instructions.

In one example, allocator and renamer block 130 includes an allocator to reserve resources, such as register files to store instruction processing results. However, core 101 is potentially capable of out-of-order execution, where allocator and renamer block 130 also reserves other resources, such as a reorder buffer to track instructions. Block 130 may also include a register renamer to rename program/instruction reference registers to other registers internal to core 101.

Reorder/retirement unit 125 includes components, such as the reorder buffers mentioned above, to support out-of-order execution and later retirement of instructions executed out-of-order, as well as other components, such as load buffers and store buffers to track load and store operations.

Scheduler and register files block 120, in one embodiment, includes a scheduler unit to schedule instructions/operation on execution unit 110, as stated above. Register files associated with execution unit 110 are also included to store instruction processing results. Exemplary execution units available in execution unit 110 include a floating point execution unit, an integer execution unit, a jump execution unit, a load execution unit, a store execution unit, and other known execution units.

Disabling of cache ways to save power was discussed above in reference to instruction cache 145. Yet, disabling ways or banks of memory based on usage may be done in any style of memory, including any level, type, or implementation of a cache memory. For example, lower-level data cache 105, such as a first-level data cache, is used to store data operands/elements recently fetched and/or operated on by execution unit(s) 110. Way predictor logic, such as logic 150, is potentially included in cache 105, higher-level cache 155, or other memory arrays, not illustrated, to disable ways in response to usage, or non-usage, of ways.

Figure 2:
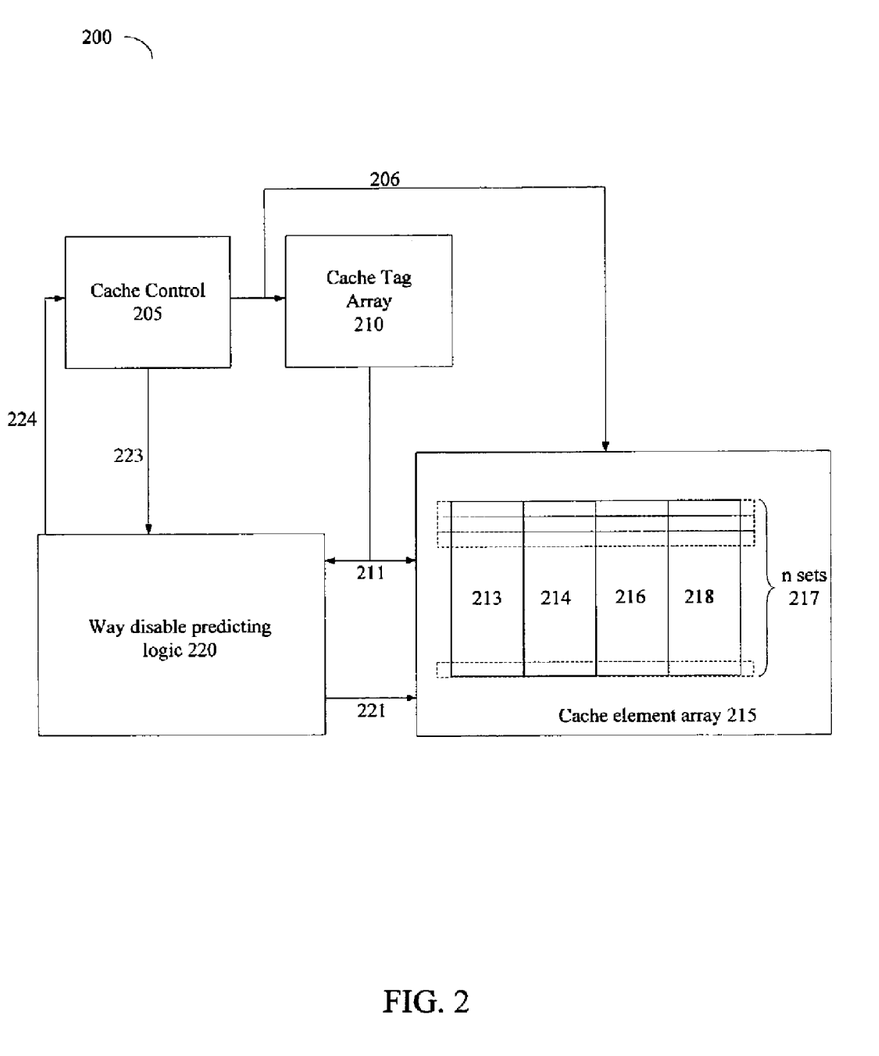
FIG. 2 illustrates an embodiment of a cache capable of disabling specific ways in response to way usage.

Turning to FIG. 2, an embodiment of a cache capable of having ways disabled in response to history based usage patterns is illustrated. In one embodiment cache 200 includes cache control logic 205. As an example, cache control logic 205 is to receive an address, a portion of an address, or other request referencing an address. Note that the address may be a virtual memory address, physical address, or other address. Depending on the size, location, and hierarchical position of cache 200, cache 200 may operate utilizing virtual or linear addresses.

Cache tag array 210 is coupled to cache control 205 and outputs way select signal 211. In one example, such as in a lower-level cache, tag array 210, which stores tag values used to index cache element array 215, stores virtual tags, where a tag lookup occurs while an issued virtual address is being translated to a physical address in a translation lookaside buffer (TLB). In this case, cache control 205 does not have to wait for the TLB to translate an issued virtual address into a physical address to perform a tag lookup in cache tag array 210. In another embodiment, such as in a higher level cache, cache tag array 210 stores physical address tags. In both embodiments, cache tag array 210 is to store tag values to index cache element array 215. Most often tag values consist of a portion, such as a number of the least significant bits, of an address or memory location. However, other methods of tagging, such as hashing a portion of an address may also be used.

As the tag values are smaller than full addresses in cache element array 215, it is potentially quicker to read them and compare them with an issued address. Here, cache control 205 determines an issued tag value from an issued address and performs a match in cache tag array 210. In one embodiment, matching a tag value in cache tag array 210 to an issued tag value is referred to as a cache hit. When no tag value is matched, it is referred to a cache miss, and an element is retrieved from a higher-level memory. Once an issued tag value is matched in cache tag array 210, the matched tag values indexes a location within cache element array 215. In one embodiment, upon a match or hit, cache tag array 210 generates way select signal 211, which references a way that a cache element resides in cache element array 215.

Cache element array 215 is to store elements, such as elements that have been recently fetched from higher level memories or operated on by functional units. An element refers to an instruction, a data element, an operand, a grouping of bits, or any other element known to be stored in a memory device. In the example shown, cache element array 215 is organized into K ways and n sets. Here, cache element array 215 is logically viewed as including K ways, whether cache element array 215 includes memory that is physically organized in that manner, memory that is physically separate forming K ways, or a single bank of memory logically broken up into K ways. As discussed above, each location, which is often referred to a cache line, with the same offset within a way forms a group called a set. Each cache line is also potentially capable of storing multiple elements per line. As a specific illustrative example, each cache line is capable of storing four elements per line. Note that a cache may also store elements in blocks or traces, which are potentially stored non-aligned with boundaries of each line of cache.

After receiving way select signal 211 from cache tag array 210, an element is read from the way referenced by way select signal 211. Typically, the element is then provided in response to the issued request that referenced the issued address. Upon a miss to cache 200, as discussed above, an element is fetched from a higher-level memory and stored in cache element array 215. Often when storing a new entry in cache 200 an older entry is removed, i.e. evicted, to make room for the new entry. Cache control 205 includes logic to implement a replacement algorithm, such as a last recently used (LRU) algorithm, to choose which line of cache 200 is to be evicted.

Way disable predicting logic 220 is coupled to cache element array 215 and to cache tag array 210. In one embodiment way disable predicting logic 220 is to track hits to ways of cache element array 215. As an example, logic 220 stores a record of hits to each of the K ways of cache element array 210. Here, in response to receiving way select signal 211 referencing the hit way, logic 220 tracks that reference, or hit, to the hit way. In one embodiment, logic associated with each way, such as a register or counter, increments for each hit to a way associated with the logic. In this case, a simple count for every way that is hit is kept.

In another embodiment, misses to a way, or consecutive misses to a way are tracked. Here, logic is again associated with each way; however, every way that is not referenced by way select signal 211, is decremented from a current value to track way select signal 211. Therefore, upon a miss to cache 200 potentially all the logic associated with the ways is decremented to represent a miss to all of the ways. As an illustrative example, assume that cache element array has four ways as shown in FIG. 2, i.e. ways 213, 214, 216, and 218, and that way select signal 211 references way 213. Logic associated with the other groups of ways, i.e. ways 214, 216, and 218, not including way 213, is decremented from a current value. Here, the logic may be set to an initial predetermined value/number of hits, such as 16. Therefore, upon a first hit to way 213, logic associated with ways 214, 216, and 218, are decremented from 16 to 15. Essentially, the hit to way 213, or in other words the misses to ways 214, 216, and 218, is tracked by decrementing logic associated with other ways that are not hit. In addition, logic associated with way 213 in way disable predicting logic 220 may also be incremented or reset to the predetermined value/number of hits. In that case, tracking includes both incrementing the hit way and decrementing the other non-hit ways. Specific illustrative examples of logic in way disable predicting logic 220 are discussed below in reference to FIGS. 3-5.

Furthermore, way disable predicting logic 220 is also to generate power signal 221 associated with a way of K ways 213, 214, 216, and 218. In a first logical state the power signal is to represent that the associated way is to be powered on. In a second state, the power signal is to represent that the associated way is to be powered down, if it is determined that the associated way is to be powered down. Here, the way selected to be powered down is potentially referred to as a saturated way. In one embodiment, power signal 221 includes separate individual signals to each way of cache element array 215. In another embodiment, one signal is generated with a reference to a way of cache element array 215. As an example with a single power signal, two logical values are generated to reference any one of the four ways.

In one embodiment, determining if the saturated way is to be powered down is done in response to tracking consecutive misses to cache element array 215. Continuing the example above, where consecutive misses to a way are tracked by decrementing logic associated with non-hit ways and potentially incrementing logic associated with a hit way; when one way's associated logic is decremented to a saturated value, such as zero, then it is determined that the one way, i.e. the saturated way, is to be disabled or powered down.

For example, assume that each way is associated with logic that is initialized to a predetermined number of hits of 16. Also assume, that 16 tag matches have occurred in cache tag array 210, each resulting in way select signal 211 referencing way 213. Consequently, for each reference of way select signal 211, logic associated with ways 214, 216, and 218 is decremented. On the last hit to way 213, the logic associated with ways 214, 216, and 218 is decremented to zero. In response to being decremented to zero, the logic associated with ways 214, 216, and 218 generate a saturation signal indicating those ways are to be disabled/powered down. In one embodiment, the saturation signal itself is used as a power signal or disable signal to power down the ways. In another embodiment, the signal is taken as an input into other control or logic, and the power signals are generated in response to the saturation signal being asserted or de-asserted.

Although not specifically shown, power logic may also be present to power down saturated ways 214, 216, and 218 in response to receiving the power or disable signal representing the ways are to be powered down. Powering down a way includes removing, reducing, gating, sinking, or other method of powering down a component or memory bank. As another embodiment, the power signal is an interrupt like signal that is handled by a handler to initiate power down/up of ways.

However, as performance is also a concern for cache devices, in one embodiment, cache ways 214, 216, and 218 are capable of being re-enabled after being disabled/powered down. Here, when way select signal 211 references a powered down way, the way is enabled, since a hit to the way has occurred. For example, assume that ways 214, 216, and 218 have been powered down. A fetch operation referencing an issued address is executed. Based on the issued address a tag match in cache tag array 210 occurs, and cache tag array 210 generates way select signal 211 referencing way 214. In response to way select signal referencing way 214, way 214 is re-enabled. In the embodiment where each way is associated with a power signal, the power signal is toggled to re-enable way 214, i.e. power is supplied to way 214 again.

As a result of hitting way 214, a misprediction has occurred. In other words, it was predicted that way 214 should be powered down, because it was not being actively utilized; however, an actual hit to way 214 disproves that historical prediction. Yet, since way 214 was previously predicted to be powered down in response to a historical usage pattern, way 214 may no longer store accurate data. Therefore, the fetch operation or other operation associated with the hit to way 214 is recycled. Here, recycle signal 224 is toggled to alert cache control 205 that a recycle of the associated operation is to occur. In one embodiment, recycling a fetch or other instruction includes re-issuing the fetch or other instruction. As an example, an instruction pointer is returned to the fetch or instruction, the instruction is re-executed, and the element is fetched from a valid location to be stored in cache 200.

In one embodiment, to ensure optimum performance upon a clearing condition, such as a recycle condition, a misprediction, a nuke, or other condition, powering down of ways in cache 200 is disabled. As an illustrative example, assume an OR gate takes the saturation signal associated with way 214 and clearing conditions signal 223 as inputs. By default the saturation signal is a logical 1 representing way 214 is to be enabled and clearing conditions signal 223 is a logical 0 representing no clearing conditions have occurred. Therefore, an output power signal 221 is a logical 1, which enables way 214. Upon determining way 214 is to be disabled/powered down, the saturation signal is de-asserted and output enable/disable signal 221 is de-asserted to disable way 214.

Yet, when a clearing condition, such as a misprediction, recycle, nuke, or other clearing condition occurs, clearing condition signal 223 is asserted for a period of time, a number of cycles, or for a number of operations. As a result, no matter what saturation signal 221 represents, output signal/power signal 221 is asserted to enable way 214 for the period of time that the clearing condition signal is asserted. In other words, powering down of way 214 is disabled for that period of time that the clearing condition signal is asserted. As an example of a period of time, powering down of ways is disabled for two fetch operation attempts. Note that use of a logical OR gate and logical values for signals is purely representative.

Figure 3:
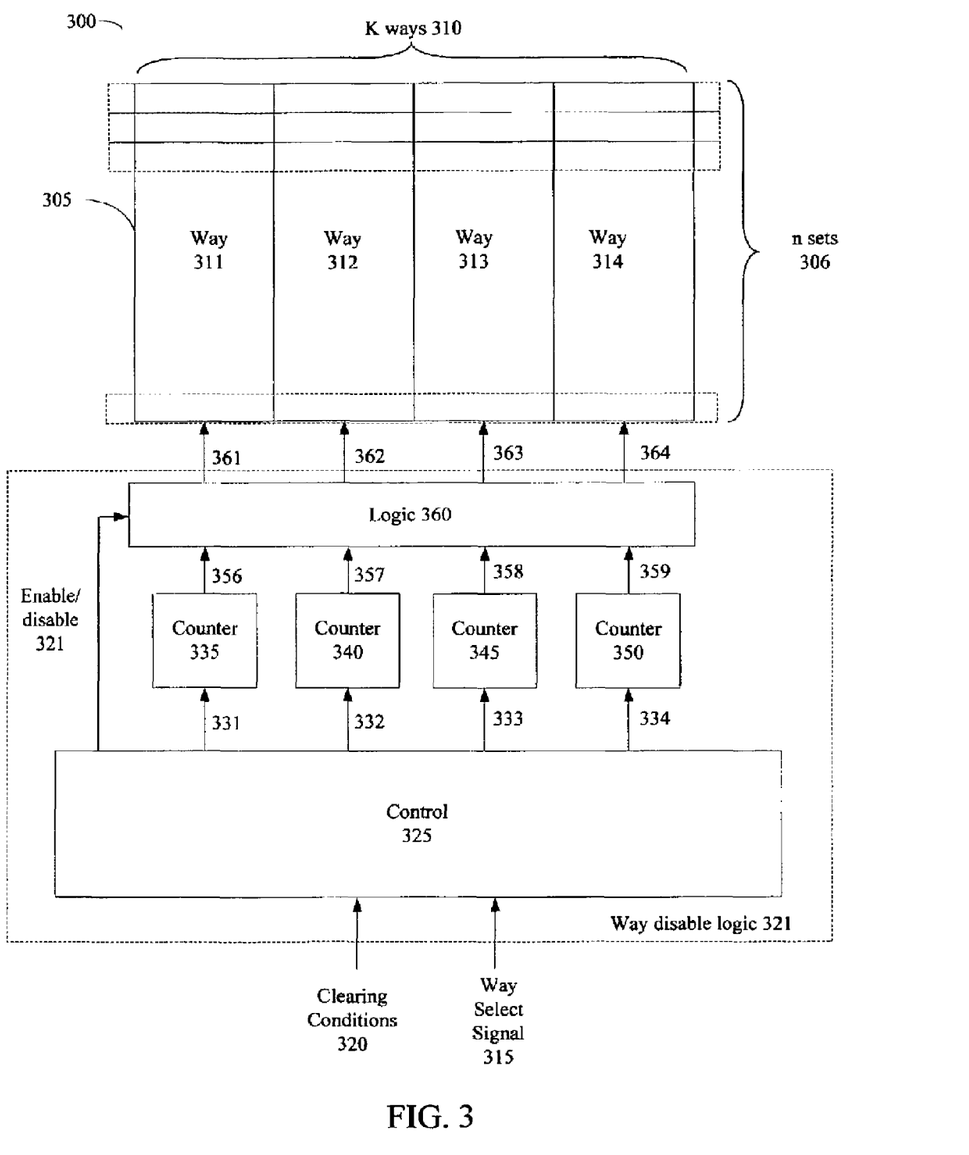
FIG. 3 illustrates an embodiment of a cache including way disable logic to disable ways of a cache.

Referring next to FIG. 3, an embodiment of at least a portion of a cache capable of having ways disabled is illustrated. As above, a cache element array 305 to store elements, such as instructions or data, is organized into K ways 310 and N sets 306. As an illustrative embodiment, array 305 is organized into four ways, i.e. ways 311, 312, 313, and 314. Consequently, cache element array 305 is referred to as a four way set associative cache. Cache 300 may include any number of other components, such as the control logic and tag array illustrated in FIG. 2.

Way disable logic 321, which may also be referred to as way predictor logic, is to track accesses and/or consecutive misses to array 305 and to provide enable/disable signals 361, 362, 363, and 364 to ways 311, 312, 313, and 314, respectively. In one embodiment, way disable logic 321 includes K counters, each of the K counters being associated with each on of K ways 310. Specifically, counter 335 is associated with way 311, counter 340 is associated with way 312, counter 345 is associated with way 313, and counter 350 is associated with way 314. As a first example, counters 335, 340, 345, and 350 keep a count of hits to their associated ways.

However, as another example, tracking of accesses, hits, and/or misses to a way includes decrementing counters associated with the non-hit ways. To illustrate, assume that a hit to way 312 has occurred, i.e. control logic or a tag array, has indicated an element is present in way 312 as referenced by way select signal 315. Here, counters 335, 340, 345, and 350 are initialized, or by default set, to a predetermined value/ number of allowable/consecutive misses, i.e. hits to other ways. In one embodiment, the predetermined number of allowable misses is to be stored in a register that is user-addressable. In another embodiment the register is set to a value by the system. For this illustration, assume the predetermined number of misses is equal to 16.

Control logic 325 is to decrement counters 335, 345, and 350 to 15 by providing a decrement signal on counter control lines 331, 333, and 334. Essentially, control logic takes way select signal 315, which references way 312, as an input, and decrements counters 335, 345, and 350, which are associated with the ways missed or not hit, i.e. ways 311, 313, and 314. From the perspective of a single counter, such as counter 335, in response to any hit/read to "an other group of ways," including ways 312, 313, and 314, or potentially a miss to all the ways, counter 335 is decremented. Since the hit was to way 312, counter 335 is decremented by control logic from a current value of 16 to a next lower integer of 15. Therefore, as illustrated above, control 325 decrements K−1 counters, 3 in this example, in response to tracking a hit to way 312 by reference of way select signal 315.

Way disable logic 321 is also to determine when a way, such as way 311, is to be powered down or disabled. As stated above, counters 335, 340, 345, and 350 are by default set to a predetermined number of hits. In one embodiment, where a line of cache is capable of storing four elements per line of cache, walking a cache line sequentially results in four hits to the same way. As a first example, walking a line may be treated as a single hit, and the predetermined number of hits is adjusted accordingly. Alternatively, each hit is counted and the predetermined number of hits is increased. For example, when the predetermined number of this is a multiple of 4, such as 16 hits, walking four lines of cache 300 results in 16 hits.

As can be seen, the predetermined value may be altered to obtain a balance between ensuring performance, i.e. keeping more ways powered up longer, and power savings, i.e. willingness to disable ways on a less number of misses. Because of this, in one embodiment, a user-addressable register is utilized to allow a user to tune a number of misses, i.e. hits to other ways, before a way is disabled. Alternatively, the number is set by the system and is not accessible by users.

In an illustrative example of determining when a way, such as way 311, is to be powered down or disabled, assume that counters 335, 340, 345, and 350 are by default set to 16. Now assume two lines in way 312, a line in way 313, and a line in way 314 are sequentially walked, where each line stores four elements. When the first two lines in way 312 are walked, eight hits to way 312 are registered and denoted by way select signal 315. For every one of those hits, control 325 decrements counters 335, 345, and 350, which leave each of those counters with a current value of eight. Additionally, when walking the line in way 313, counter 335 and 350 is further decremented to 4. Here, counter 345 may be incremented by each hit to 12 or reset to the predetermined value of 16. Incrementing and resetting a counter associated with a hit way will be discussed in more detail below.

Upon walking the line in way 314, four hits to way 314 are referenced on way select signal 315. Counter 335 is then decremented to 0. In one embodiment, counter 335 is a saturation counter, which toggles saturation signal 356 when its current value reaches zero. For example, assume logic 360 includes an OR gate, as discussed in an example above, to OR enable/disable signal 321 and saturation signal 356. Here, saturation signal 356 is held high as long as counter 335 is not at zero, which results in power signal 361 remaining high to enable way 311. However, when counter 335 is equal to zero, saturation signal 356 is driven/toggled low. As a result, power signal 361 is also driven low to disable way 311. Therefore, in this example, it is determined that way 311 is to be disabled when counter 335 reaches zero.

Similarly, saturation signals 357, 358, and 359 operate in the same manner, and are potentially individually logically combined with enable/disable signal 321 in logic 360. However, if enable/disable signal 321 is not included or coupled elsewhere, saturation signals 356, 357, 358, and 359 may, by themselves, directly operate as disable/power down signals for ways 311, 312, 313, and 314.

In addition, in this example enable/disable signal 321 is initially held low to enable powering down of ways 311, 312, 313, and 314. Based on clearing conditions as represented by clearing conditions signal 320, powering down of ways 311, 312, 313, and 314 may be disabled. Here, enable/disable signal 321 is driven high. Consequently, an OR gate in logic 360 drives power down signal 361 high, regardless of the output of saturation signal 356. The high value of signal 361 enables way 311, i.e. disables any powering down of way 311 based on saturation signal 356. Examples of clearing conditions that result in disabling an ability to power down ways, at least for a period of time, include recycling a fetch, mispredicting a way to be powered down, branch instruction redirections, a nuke, and other caching related events. In this example, upon detecting clearing conditions and returning to normal operations, counters 335, 340, 345, and 350 retain their current values. However, in another embodiment, counters 335, 340, 345, and 350 are reset to the predetermined number of allowable misses. Clearing conditions will be discussed in more detail in reference to FIG. 7.

It was referred to above, that control 325, in conjunction with decrementing non-hit way associated counters, potentially increments or resets a counter associated with a hit way. For example, assume that ways 311-314 are initialized to a value of 15, and then 4 hits to way 312 are tracked decrementing counters 340, 345, and 350 associated with ways 311, 313, and 314, respectively, to a current value of 11. Next, way select signal 315 references a hit to way 311. Control 325 decrements counter 340 to 14 and ways 345 and 350 to 10. However, there are options in regard to how hit way counter 335 is treated. In one embodiment, the current value of counter 335 is held, i.e. counter 335 retains value 11. In another embodiment, counter 335 is incremented. As a first example, incrementing counter 335 includes adding a single integer, i.e. the current value becomes 12. However, counter 335 may also be incremented/reset to the default predetermined value of 15.

As an example of logic 360 an OR gate was discussed to illustrate potential operation. However, logic 360 includes any logic to generate power, a.k.a enable/disable, signals 361-364 in response to saturation signals 356-359 generated by counters 335, 340, 345, and 350. In one embodiment, signals 361-364 are also to enable ways, if a hit to a powered down way occurs. For example, assume that way 314 is powered down in response to counter 350 being decremented to zero. Next, a fetch operation references a location in way 314, such as a hit to way 314. Since way 314 is powered down due to a prediction based on historical usage, it may be said that a misprediction occurred in powering down way 314. Consequently, way 314 is powered up and the fetch is recycled.

In one embodiment, counter 350 is reset to a predetermined number of hits, which results in saturation signal 359 toggling from a disable logical value to an enable logic value. Logic 360 then drives power signal 364 to a logical value that enables way 314. Although not shown, power logic powers down or powers up way 314 based on signal 364. For example, when signal 364 represents a first value, power is removed or reduced utilizing gating logic, and when signal 364 represents a second value, the gating logic allows power to way 314.

Figure 4:
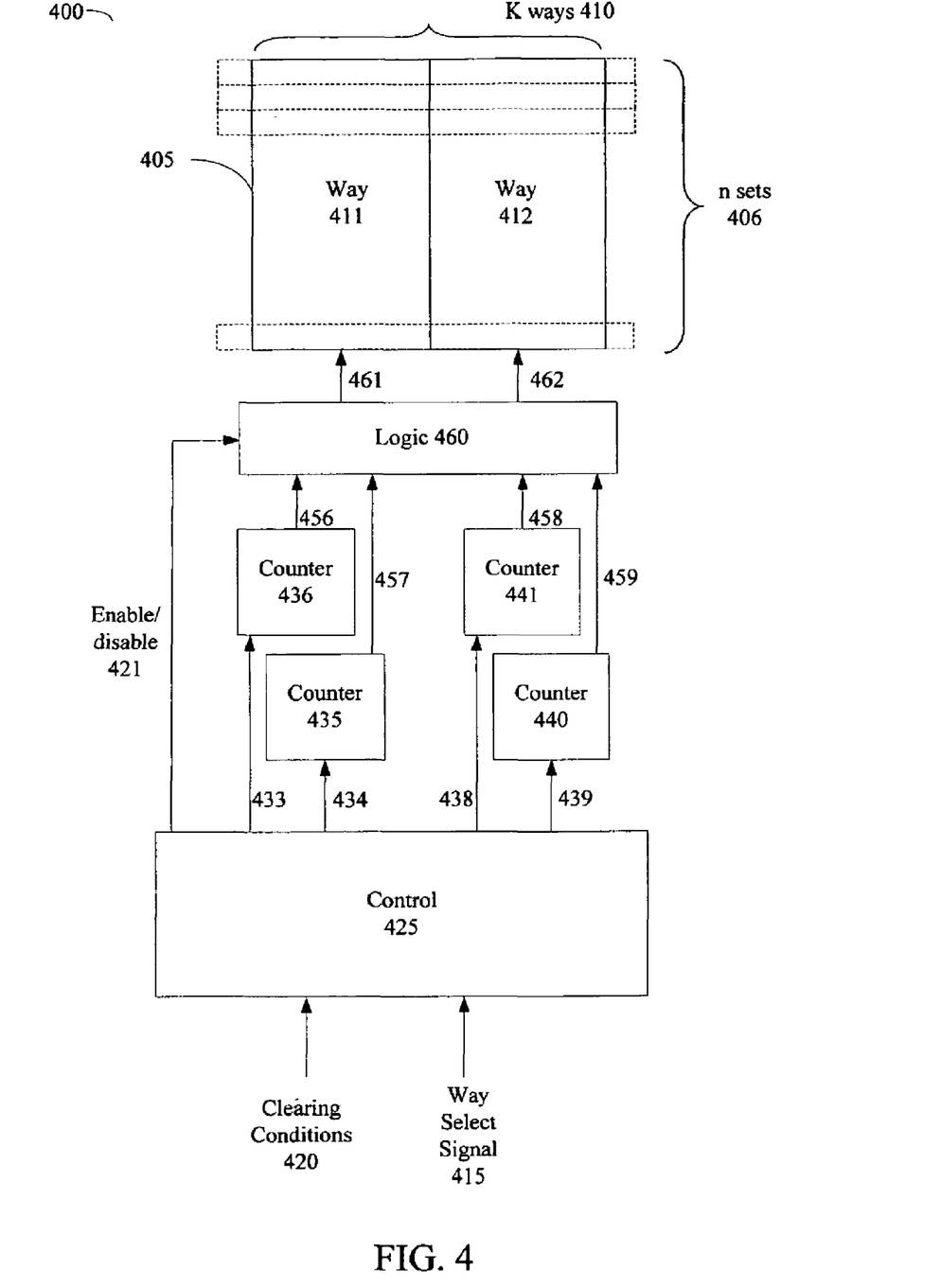
FIG. 4 illustrates an embodiment of a cache including way disable logic capable of separately tracking cache accesses from multiple threads.

Turning next to FIG. 4, an embodiment of a cache capable of separately tracking cache accesses from multiple threads is illustrated. Above, tracking hits to ways was discussed without reference to multiple cores or threads. In fact, in one embodiment, hits to ways of cache, i.e. misses to the other ways, are tracked ignoring which thread or core is associated with the hit. Here, cache ways are disabled based on any consecutive misses to the ways of the cache. In another embodiment, hits to each way are separately tracked for each thread. Here, a processor is capable of concurrently executing multiple threads. Multiple threads may be executed on multiple cores, multiple hardware threads, or a combination thereof. In one embodiment, a set of counters is duplicated for each processing resource, such as a core, logical processor, and/or thread.

FIG. 4 illustrates an embodiment of a portion of a cache for a two resource processor, such as a dual core processor and/or a processor capable of executing two threads. A first group of counters, i.e. counter 435 and 440, are associated with way 411 and way 412, respectively. In addition, a second group of counters, counters 436 and 441, are associated with way 411 and way 412, respectively. Similar to previous operation, counters 435, 436, 440, and 441 are set to a default predetermined value or number of allowed misses, i.e. hits to other ways. However, counters 436 and 441 track hits/misses from a first thread and counters 435 and 440 track hits/misses from a second thread executing concurrently with the first thread. As a result, a thread specific disabling algorithm may be used in determining which ways to power down.

As an example, assume a hit to way 411 occurs as a result of execution of a first thread. Control 425 receives way select signal 415, which by itself or in conjunction with another signal, references that way 411 was hit and that the first thread is associated with the hit. In one embodiment, a thread identifier is used to determine which thread hit cache 400. Control 425: (1) increments/resets counter 435, which is associated with the first thread and hit way 411, utilizing control signal(s) 434 to track the hit to way 411; (2) decrements counter 440, which is associated with the first thread and way 412, utilizing control signal(s) 439 to track the miss to way 412, i.e. the hit to way 411; and (3) holds the current value of counters 436 and 441 utilizing control signals 433 and 438, respectively, as both counters are associated with the second thread, not the first thread.

In one embodiment, when a counter reaches zero, the way it is associated with is disabled for an associated thread. Logic 460 generates power signals 461 and 462 in response to saturation signals 456, 457, 458, and 459. Any algorithm to determine which ways to power down based on the separate tracking of hits by threads may be used. For example, if any counter reaches a saturation value, the associated way is powered down in regards to the thread that the saturated counter is associated with. Alternatively, all counters or a percentage of counters associated with a saturated way have to reach the saturation value before the saturated way is powered down. Logic 460 is to implement a thread specific algorithm, which operates on saturation signals 456, 457, 458, and 459, as well as enable/disable signal 421. Enable/disable signal 421, as above, potentially disables powering down of ways 411 and 412 for a period of time, such as for a number of operations, based on clearing conditions 420. As can be seen, any number of counters may be replicated/duplicated to track hits from more threads, and any algorithm to disable ways based on that tracking may be implemented. As an example, a four core processor capable of executing two threads per core is capable of executing 8 threads of execution in parallel. Here, four sets of counters may be associated with each core. Alternatively, eight sets of counters may be present, with each set of counters tracking consecutive misses to the ways.

Figure 5:
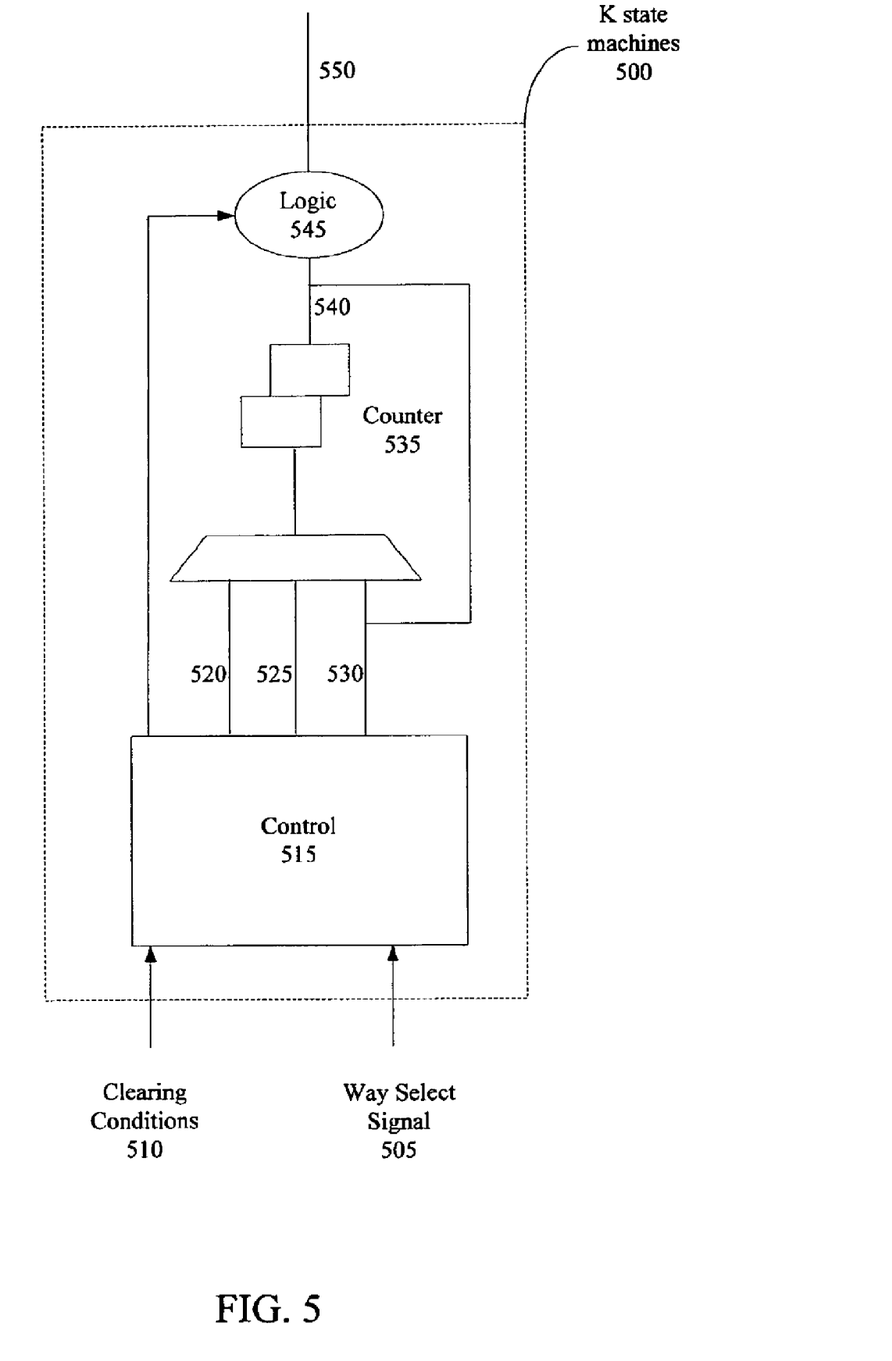
FIG. 5 illustrates an embodiment of a state machine for disabling a way of cache based on cache usage.

FIG. 5 illustrates an embodiment of logic to be associated with a cache way to track hits and/or misses to a cache and to disable a cache way based on historical usage of the cache. Here, K state machine 500 is illustrated, which is potentially replicated for every way of a cache. Control logic 515 takes way select signal 505 as an input. In one embodiment, way select signal 505 at least references a way of a cache that is hit. Saturation counter 535 is set to a predetermined value. Note from above that counter 535 is potentially duplicated for every processing resource sharing the cache. In one example, the predetermined value is a predetermined number of misses, i.e. hits/reads to other ways, to be stored in a user-addressable register, such as a machine specific register (MSR).

If way select signal 505 references way 560, then control 515 provides an increment signal on signal 520 to saturation counter 535. In one embodiment, an increment signal increments counter 535 by a single integer. For example, if a current value of counter 535 is 10 and an increment signal is received, the current value is incremented to 11. In another embodiment, when increment/reset signal 520 is received, counter 535 is reset to the predetermined value. As an example, when the current value is 10, the counter is reset to a predetermined value, such as 15.

In contrast, if way select signal 505 references a way of cache other than way 560, i.e. an other group, not including way 560, then control 515 provides a decrement signal on line 525. Here, counter 535 is decremented. As an example, if counter 535 is by default set to 15, the current value of counter 535 is decremented to 14. If counter 535 saturates, i.e. reaches 0, then saturation signal 540 is generated, i.e. toggled from a default enable value to a disable value.

In one embodiment, logic 545 includes an OR gate, taking clearing conditions 510, a.k.a an enable/disable power down of ways signal, and outputting power signal 550. Table A below illustrates operation of an exemplary OR gate in logic 545.

TABLE A

Illustrative operation of OR gate in logic 545

| | Clearing Condition 510 | Saturation Signal 540 | Power Signal 550 |
|---|---|---|---|
| Default: Power Down Enabled; Way Powered ON | 0 | 1 | 1 |
| Power Down Enabled; Way Powered Down; | 0 | 0 | 0 |
| Power Down Disabled; Way Powered ON, | 1 | X | 1 |

Here, saturation signal 540 is by default set to a logical one, which represents that counter 535 is not at zero, i.e. way 560 is to be powered on. Clearing conditions signal 510 is set to a logical zero, which represents that powering down of ways is enabled. In other words, when clearing condition signal 510 represents a logical zero, saturation signal 535 dictates whether way 560 is powered on or off. Consequently, if counter 535 is decremented to zero, saturation signal 535 is driven to a logical zero and power signal 550 is toggled to a logical zero to power down way 560. However, if clearing conditions signal 510 is toggled to a one in response to a clearing condition, such as a misprediction, branch instruction redirection, nuke, or other event, then power signal 550 is driven to a logical one to power ON way 560 regardless of saturation signal 535's value. Hence, powering down of way 560 in response to saturation signal 540 is effectively disabled.

Note that use of a predetermined number of misses, incrementing on a hit to an associated way, and decrementing in response to a hit to another way is purely illustrative. For example, counters may be set by default to zero, decremented/reset upon a hit to an associated way, and incremented upon a hit to another way. Here, when the counter reaches a certain value, such as 15, the way is powered down.

Figure 6:
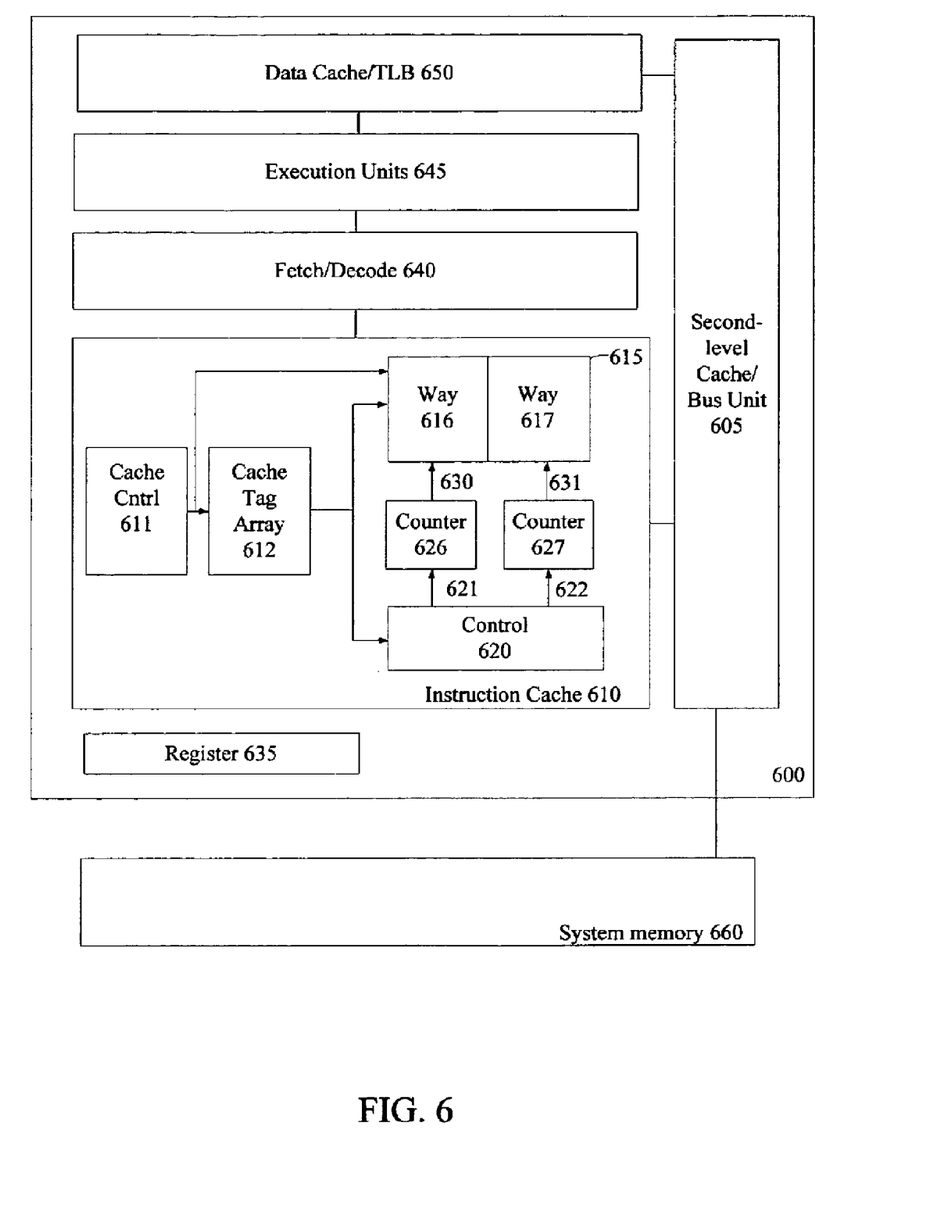
FIG. 6 illustrates an embodiment of a system capable speculatively disabling specific ways of cache.

Turning to FIG. 6 an embodiment of a system capable of disabling cache ways is illustrated. Processor 600 is coupled to system memory 660. Examples of system memory 660 include random access memory (RAM), dynamic ram (DRAM), double-data-rate (DDR) RAM, Buffered RAM, Non-volatile memory, and flash memory. System memory 660 is to store elements, such as instructions and data to be executed and operated on in processor 600. Processor 600 includes data caches, such as data cache 650, instruction cache 610, and second level cache 605 to store recently fetched elements from system memory 660. All of these caches may implement any combinations of features discussed above.

In the embodiment illustrated, the simplified pipeline of processor 600 includes fetching instructions from system memory 660. In this stage, instructions are potentially retrieved from instruction cache 610 and data is potentially retrieved from data cache 650 and/or second level cache 650. Instructions are then decoded in fetch/decode 640, executed in execution units 645, and stored back to caches or system memory 660. Other pipeline stages and logic may be included in processor 600. For example, components discussed in reference to FIG. 1 are included in processor 600. Moreover, in one embodiment processor 600 is a multi-core processor capable of parallel execution of multiple threads.

Although, way disabling is potentially included in any or all caches on processor 600, the disabling of ways is discussed in reference to instruction cache 610. Instruction cache 610 includes a cache array organized into at least first way 616 and second way 617. Also included in cache 610, is first counter 626 associated with way 616 and second counter 627 associated with way 617. Counters 626 and 627 are initially set to a default value and at any time during operation have a current value.

In one embodiment, upon a hit to way 617, counter 626 is set to a first value. As a first example, the default value of counter 626 is a predetermined integer, such as 15. In response to the hit to way 617, the current value of 15 is set to a current value of 14. In this example, if a hit to way 616 occurs, the current value of counter 626 is set to a second value. The second value may be the predetermined value of 15, or just an integer that is higher than the current value. In this example, when counter 626 is decremented to a saturation value, such as zero, way 616 is disabled, as discussed above. For example, saturation signal 630 is taken as an input by logic associated with way 616, which is to generate a power signal to power down way 616 in response to saturation signal 630 being toggled from a default logical state to a second saturated state.

Setting a current value of counter 626 may be done by control 620 utilizing control signal(s) 621. In one embodiment, control signal 621 is multiple signals, such as an increment signal, a decrement signal, and a hold signal. Here, control 620 is to drive one of the three signals to increment, decrement, or hold a current value of counter 626.

The above example, illustrates setting counters at a value and counting down every time a hit to another way occurs. However, in the alternative, the counters may be set to a base number, such as zero, and incremented every time a hit to another way occurs until a predetermined saturation value is reached. For example, counter 626 is initially set to a default value of zero. When a hit to way 617 occurs, the first value is a value that is higher then the current value, such as one. In response to a hit to way 616, the second value is the default value of zero or an integer lower than the current value. Note that control line 622, counter 627, and saturation signal 631 operate in a similar manner to control line 621, counter 626, and saturation signal 630.

Therefore, whether counters 626 and 627 count up or down to disable ways, once a saturation value, such as zero or a predetermined integer, is reached, then ways 616 and 617 are powered down/disabled. In the first example, where counters 626 and 627 are set to a predetermined integer and count down, the predetermined integer is potentially stored in a register, such as register 635. In the second example, where counters 626 and 627 are set to zero and count up to a predetermined integer, the predetermined integer is also potentially stored in register 635. In one embodiment, register 635 is a machine specific register (MSR) that is user-addressable.

Figure 7:
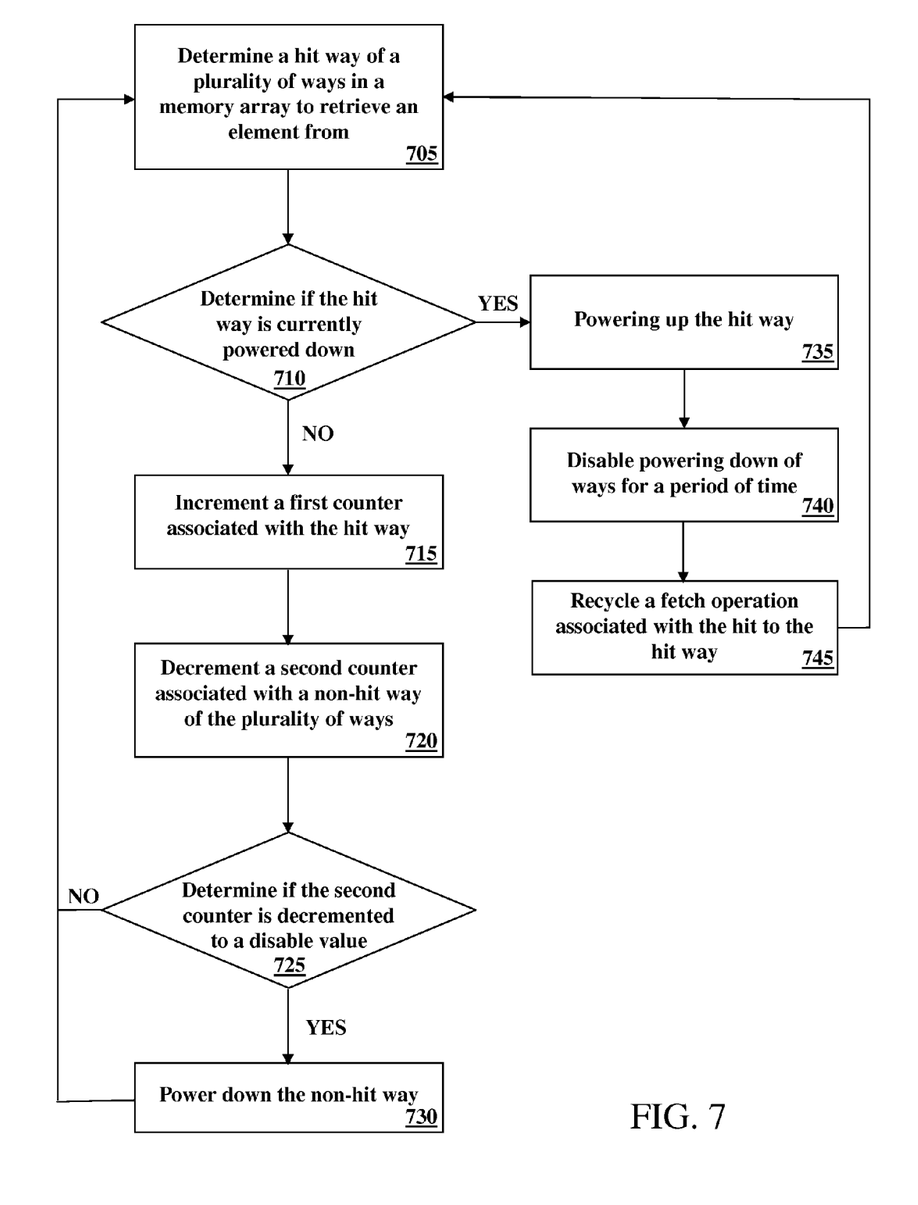
FIG. 7 illustrates an embodiment of a flow diagram of a method for tracking accesses to a cache and powering down a cache way in response to previous cache access patterns.

Referring next to FIG. 7 an embodiment of a flow diagram for a method of disabling/enabling ways in response to history based usage patterns is illustrated. In flow 705, a hit way of a plurality of ways in a memory array to retrieve an element from is determined. In one embodiment, the memory array is a cache and the element is an instruction or data. Here, an issued cache tag value is compared and matched to a stored tag value, which is associated with the hit way.

As an example, a fetch operation is executed to fetch an instruction. The location of the instruction is referenced by a virtual address. In a virtually indexed cache, a portion of the virtual address is used as the tag value to index the cache. In contrast, in a physically indexed cache, the virtual address is translated in a unit, such as a translation lookaside buffer (TLB). Here, a portion of the translated physical address is used as the tag value. By matching the issued tag value with the stored tag value, it is determined which way of a cache element array a requested element resides. Note that any number of cache ways may be speculatively read before the tag match is complete and the correct location of the speculatively read locations is returned upon determining the correct way.

In flow 710, it is determined if the hit way is currently powered down. If the way is currently powered down, a hit or attempted access to a location in that way may have incorrectly stored information. However, if the way is powered on, i.e. not currently powered down, then a first counter associated with the hit way is incremented. In one embodiment, incrementing the first counter includes incrementing a current value of the first counter by a single integer, unless the current value is already set to a maximum predetermined value. For example, if the current value of the counter is five, then the current value is incremented to six. In another embodiment, incrementing the current value includes resetting the current value of the first counter to a default number of hits value. As an example, if the current value is five, then the current value is incremented/reset to a default value, such as fifteen.

In flow 720, a second counter associated with a non-hit way of the memory array is decremented, i.e. the miss to the non-hit way is tracked. In one embodiment, a current value of the second counter is decremented by a single integer. As an example, assume a cache is a set associative cache having eight ways. When a hit to the first way is determined in flow 705, then at least one and potentially all of the counters associated with the seven ways not hit is/are decremented in flow 720. If the current value of the second counter is ten, then the current value is decremented to nine.

In flow 725, it is determined if the second counter is decremented to a disable value. In one embodiment, the disable value is zero. Therefore, when the current value of the second counter is decremented to zero, a saturation signal or other output from the second counter is toggled to a different logical state from a default enabled logical state. From the change in state of the saturation signal, it is determined that the second counter has reached a disable value, such as zero. However, in flow 720, if the current value was decremented, but not to a disable value, then the flow returns to flow 705 to determine/track a next hit to the cache.

Yet, if the second counter is decremented to a disable value, then the non-hit way that the second counter is associated with is powered down in flow 730. As discussed above, in response to the saturation signal being toggled, a module or logic disables power to an associated way or generates/toggles a power signal to power down the associated way.

To further illustrate the flow shown in FIG. 7, a simplified example is discussed in reference to FIGS. 3 and 7. Assume that counters 335, 340, 345, and 350 are initially set to a predetermined number of allowable misses equal to 16, as loaded from a user-addressable register. Furthermore, assume that 5 hits to way 312 have occurred, 5 hits to way 313 have occurred, and 5 hits to way 314 have occurred. As a result of the 5 hits to way 312, counters 335, 345, and 350 have been decremented to 11. From the 5 hits to way 313, counters 335 and 350 were further decremented to 6, counter 340 was decremented to 11, and counter 345 was reset to default value of 16. Finally, from the five hits to way 314, the current values of counters 335, 340, 345, and 350 are set to 1, 6, 11, and 16, respectively.

Now assume, in flow 705, that another hit to way 314 occurs. Therefore, way 314 is referred to as the hit way. Since way 311 is not currently powered down, as determined in flow 710, a first counter, counter 350, associated with the hit way, way 314, is incremented in flow 715. In this example, incrementing includes resetting a current value of counter 350 to 16. In flow 720, a second counter, counter 335, associated with a non-hit way, way 311, is decremented. As the current value of counter 335 is one, the current value of counter 335 is decremented to zero. Counter 335 generates/toggles saturation signal 356. In response to saturation signal 356, it is determined that counter 335 is set to a disable/saturation value of zero in flow 725. Here, logic 360 performs an OR operation on saturation signal 356 and enable signal 321. Assuming enable signal 321 is set to enable based on no clearing conditions being asserted on signal 320, then power signal 361 is generated/toggled to disable/power down way 311 in flow 730. In response to this signal, power logic powers down/gates power to way 311.

A subsequent attempted access or hit then occurs. Again in flow 705, it is now determined that way 311 is referenced/hit. However, way 311 is determined to be powered down in flow 710. As way 311 has been powered down it may store incorrect information and/or data. Therefore, in flow 735 way 311, which was the non-hit way in the previous hit to way 314, is powered up. In this example, the current value of counter 335 is reset to 16. As a result, saturation signal 356 is toggled back to a default enable logical state, which in turn results in logic 360 changing the state of power signal 361 to an enable/power up state. Way 311 is then powered on by power logic.

In addition, in flow 740, powering down of ways is disabled for a period of time. Here, a misprediction occurred. In other words, way 311 was predicted to be powered down through non-use. However, an actual hit to way 311 has demonstrated that it was a misprediction to disable way 311. Therefore, a clearing condition has occurred and enable/disable signal 321 is toggled to a value to ensure that at least way 311 is powered on for a period of time, such as for two attempted fetch operations, regardless of the value of saturation signal 356. Essentially, powering down of way 311 is disabled. Now that way 311 is powered up, a fetch operation associated with the hit to way 311 is recycled. The instruction pointer is pointed to the fetch operation and the fetch operation is re-executed. In returning to flow 705, the hit to way 311 potentially occurs again and the item is properly retrieved from the cache and the counters are incremented/decremented accordingly.

As illustrated above, speculatively reading multiple ways of a cache potentially increases power consumption. However, ways of a cache may be predicatively disabled based on usage history of the ways of the cache. The amount ways of a cache are not used may be varied to ensure a proper the amount of performance versus power savings. As a result, a cache is potentially fine tuned to disable ways until the correct level of power consumption is used without sacrificing performance. In addition, after ways are powered down, the ways may be powered up during more active periods.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising: a memory including a plurality of ways; way predictor logic to generate a power signal associated with the first way to power down the first way, if the first way is determined to be powered down based on a predetermined number of misses to the first way, the way predictor logic comprises comprising:

a first counter associated with the first way, wherein a value of the counter, by default, is set to the predetermined number of allowable misses;

control logic coupled to the first counter to decrement the value of the counter in response to tracking a hit to a way of an other group of ways, not including the first way; and logic to generate the power signal, if the value of the first counter is decremented to zero.

2. The apparatus of claim 1, wherein the control logic is also to increment the value of the counter in response to tracking a hit to the first way.

3. The apparatus of claim 1, wherein the control logic is also to reset the value of the counter to the predetermined number of misses in response to tracking a hit to the first way.

4. The apparatus of claim 1, further comprising a register to store a value to represent the predetermined number of misses.

5. The apparatus of claim 4, wherein the register is user-addressable.

6. The apparatus of claim 1, wherein each line of the memory is capable of storing four elements, and wherein the predetermined number of hits is a multiple of four.

7. An apparatus comprising:

a cache element array organized into K ways;

a cache tag array coupled to the cache element array to output a first way select signal to reference a hit way of the K ways; and way disable predicting logic coupled to the cache element array and to the cache tag array, to track the first way select signal to reference the hit way, and generate a disable signal referencing a saturated way of the K ways, if the saturated way is to be disabled in response to tracking the first way select signal reference to the hit way, wherein the way disable predicting logic comprises:

K counters, by default set to a predetermined value, wherein each one of the K counters is associated with one of the K ways; and control logic to decrement K-1 counters of the K counters, which are associated with the K-1 ways other than the hit way, in response to tracking the first way select signal reference to the hit way, wherein it is determined that the saturated way is to be disabled, if one of the K counters associated with the saturated way is decremented to zero.

8. The apparatus of claim 7, wherein the disable signal is based on a saturation signal generated by the one of the K counters associated with the saturated way, when the one of the K counters associated with the saturated way is decremented to zero.

9. The apparatus of claim 7, wherein the predetermined value is to be stored in a user-addressable register, and wherein the control logic is also to increment one of the K counters associated with the hit way.

10. The apparatus of claim 7, wherein T threads share access to the cache element array, and wherein the K counters are duplicated T times to track hits from each of the T threads separately.

11. The apparatus of claim 7, wherein the cache element array, the cache tag array, and the way disable predicting logic are included in a microprocessor, which is capable of concurrently executing at least a first thread and a second thread, and wherein the way disable predicting logic comprises: a first group of K counters, by default set to a predetermined value, wherein each one of the first group of K counters is associated with one of the K ways; a second group of K counters, by default set to the predetermined value, wherein each one of the second group of K counters is associated with one of the K ways; control logic to decrement K-1 counters of the first group of K counters, which are associated with the K-1 ways other than the hit way, if the way select signal is associated with execution of the first thread, wherein it is determined that the saturated way is to be disabled, if one of the first group of K counters associated with the saturated way is decremented to zero, and decrement K-1 counters of the second group of K counters, which are associated with the K-1 ways other than the hit way, if the way select signal is associated with executing the second thread, wherein it is determined that the saturated way is to be disabled, if one of the second group of K counters associated with the saturated way is decremented to zero.

12. A system comprising: a microprocessor including a cache array including at least a first way and a second way; a first counter associated with the first way, wherein a current value of the first counter is to be set to: a first value, in response to a hit to the second way, and a second value, in response to a hit to the first way; logic coupled to the first counter to generate a signal to disable the first way, if the first value is the same as a saturated value; and a system memory coupled to the microprocessor to store elements to be cached in the cache array.

13. The system of claim 12, wherein the first value is a lower integer than the current value and the second value is a higher integer than the current value, and wherein the saturated value is equal to zero.

14. The system of claim 13, wherein the microprocessor also includes a second counter associated with the second way, a current value of the second counter to be set to: a third value, in response to a hit to the first way, and a fourth value, in response to a hit to the second way, and wherein the microprocessor further includes logic coupled to the second counter to generate a signal to disable the second way, if the third value is the same as the saturated value.

15. The system of claim 14, wherein the third value is a lower integer than a current value of the second counter and the second value is a higher integer than the current value of the second counter.

16. The system of claim 14, wherein the current value of the first counter and the current value of the second counter, are set, by default, to a number of hits value, wherein the number of hits value is to be stored in a register in the microprocessor.

17. A method comprising: determining a hit way of a plurality of ways in a memory array to retrieve an element from; in response to determining the hit way to retrieve the element from: incrementing a first counter associated with the hit way, and decrementing a second counter associated with a non-hit way of the plurality of ways; and powering down the non-hit way, if the second counter is decremented to a disable value.

18. The method of claim 17, wherein determining a hit way of a plurality of ways to retrieve an element from comprises: matching an issued tag value to a stored tag value, which is to be stored in a cache tag array and to be associated with the hit way.

19. The method of claim 17, wherein incrementing a first counter associated with the hit way comprises: incrementing a current value of the first counter by an integer value, unless the current value is equal to a default number of hits value.

20. The method of claim 19, wherein the memory array is a cache memory array to store instructions, the plurality of ways is equal to eight ways, the disable value is equal to zero, and the default number of hits value is equal to 15.

21. The method of claim 17, wherein incrementing a first counter associated with the hit way, in response to determining the hit way to retrieve the element from comprises: resetting a current value of the first counter to a default number of hits value, which is higher than the current value.

22. The method of claim 17, further comprising: powering up the non-hit way and disabling power down of at least the non-hit way for a period of time, in response to a subsequent attempted access to the non-hit way, after powering down the non-hit way.

23. The method of claim 22, wherein disabling power down of at least the non-hit way for a period of time comprises: performing a logical operation on an output signal from the second counter and a disable signal generated in response to the subsequent attempted access to the non-hit way to disable power down of at least the non-hit way.

24. The method of claim 22, further comprising recycling a fetch operation associated with the subsequent attempted access to the non-hit way.

25. The method of claim 22, wherein recycling the fetch comprises: pointing an instruction pointer back to an instruction associated with the fetch operation; performing the fetch operation.

26. The apparatus of claim 7, further comprising power down logic coupled to the cache element array to power down the saturated way in response to the disable signal.

27. The apparatus of claim 26, wherein the way disable predicting logic is also to generate a way enable signal to enable the saturated way, if a second way select signal referencing the saturated way is to be generated, after the saturated way is powered down, and wherein generating the way enable signal comprises toggling the disable signal to a different logical state to enable the saturated way.

28. The apparatus of claim 26, further comprising fetch logic to recycle a fetch associated with the second way select signal, if the saturated way is powered down upon generating the second way select signal.

\* \* \* \* \*